UNITED STATES PATENT OFFICE.

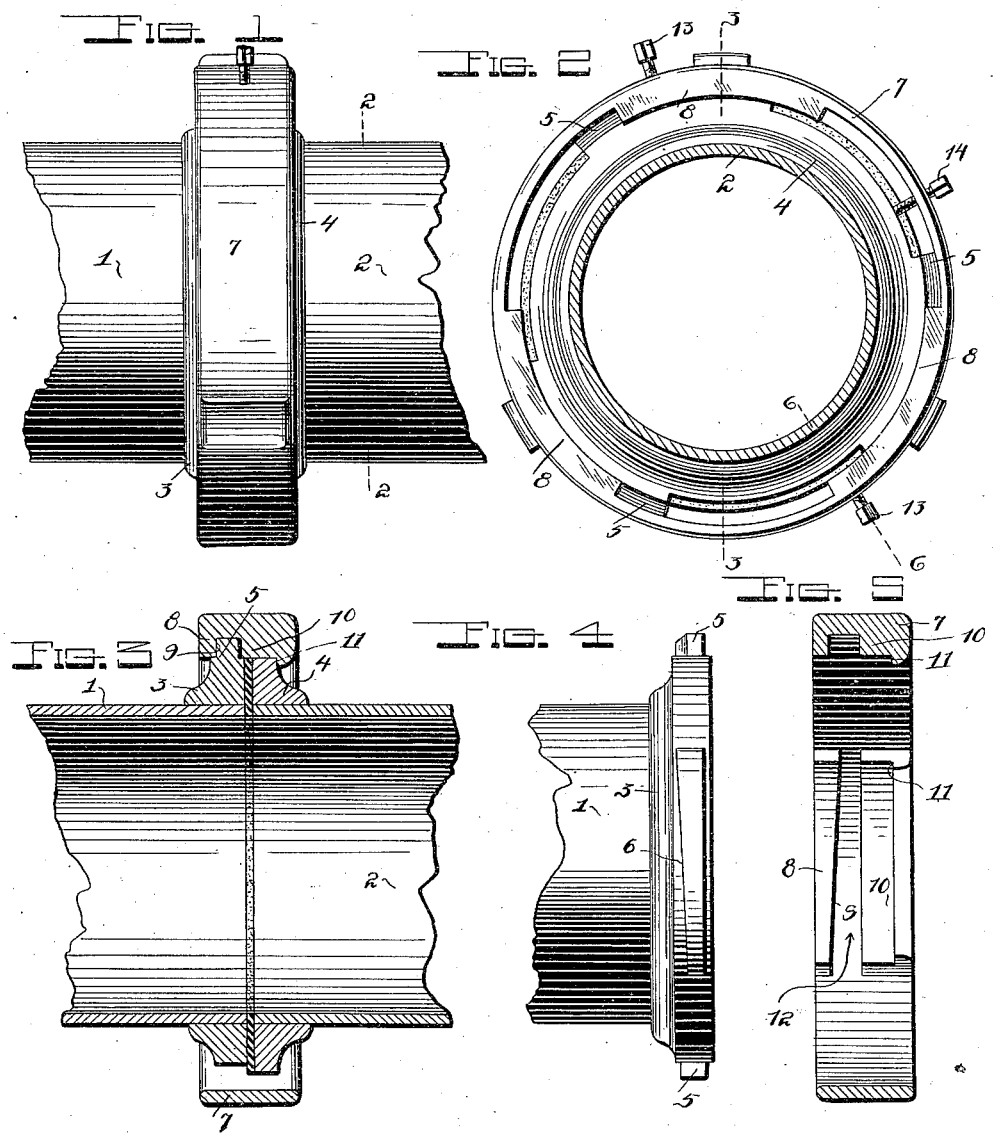

DE WITT C. BAILEY, OF NICHOLS, FLORIDA.

PIPE-COUPLING.

1,073,017.  Specification of Letters Patent.  Patented Sept. 9, 1913.

Application filed April 27, 1912. Serial No. 693,677.

*To all whom it may concern:*

Be it known that I, DE WITT C. BAILEY, a citizen of the United States, residing at Nichols, in the county of Polk, State of Florida, have invented certain new and useful Improvements in Pipe-Couplings; and I do hereby declare the following to be a full, clear, and exact description of the invention, such as will enable others skilled in the art to which it appertains to make and use the same.

This invention is directed to improvements in pipe couplings and has for its object to construct a coupling of this type which may be easily and quickly coupled or uncoupled.

A further object of the invention is to provide a ring for coupling the ends of pipes so formed that the ring may be removed from any point in a pipe line.

With these and other objects in view, this invention resides in the novel features of construction, formations, combinations and arrangements of parts to be hereinafter more fully described, claimed and illustrated in the accompanying drawing, in which:—

Figure 1 is an elevation of the device showing a pair of pipe sections coupled. Fig. 2 is a sectional view on line 2—2 of Fig. 1. Fig. 3 is a sectional view on line 3—3 of Fig. 2. Fig. 4 is an elevation of one of the pipe sections. Fig. 5 is a vertical sectional view through the ring. Fig. 6 is a sectional view on line 6—6 of Fig. 2.

Referring to the drawing, the numerals 1 and 2 designate the pipes to be coupled, both of which are provided with flanged ends 3 and 4, the former having formed upon its periphery a plurality of spaced lugs 5, the outer edges of which are inclined as at 6.

To hold the pipe sections in their coupled positions, a ring 7 is provided, the inner face of which is formed with a plurality of lugs 8. The lugs 8 are each provided with inclined edges 9, the purpose of which will appear later. The ring 7 has also formed on its inner face, and spaced from the lugs 8 a plurality of elongated projections 10, the number of projections being governed by the number of lugs 8.

Each projection is formed with a shoulder 11 against which the flanged end 4 of the pipe section 2 bears, said pipe section being held in clamped position when the lugs 5 formed on the flanged end 3 of the pipe section 1 pass between the lugs 8 of the ring 7, whereby when the ring is turned the inclined edges of the lugs 5 will engage the similar edge of the lug 8, said lugs 5 being guided in binding engagement with the lug 8 and projection 10 through the space 12 formed therebetween, and thus limiting the turning movement of the ring in one direction.

Set screws 13 are passed through the ring and have their inner ends adapted to engage the periphery of the flanged end 4 of the pipe section 2, thus holding the said ring and pipe section in fixed relation.

To prevent accidental turning of the pipe section 1 a set screw 14 is passed through the ring 7, and is of sufficient length to have its inner end bear against the flanged end 3 of the pipe section 1, and at a point between the lugs 5 formed thereon, thereby holding said parts in fixed relation.

From this construction it will be seen that should the ring 7 become broken from any cause whatsoever the same may be easily removed and a new one substituted therefor, as the construction of the ring is such that the same may be tilted to permit the flanged end 4 of the pipe section 2 to pass freely at points between the projections 10 either to remove a ring or substitute a new one. Thus it will be seen that the pipe sections may be coupled or uncoupled at any point in the pipe line, and that the rings may be interchanged if the occasion should require without uncoupling more than a pair of the pipe sections.

What is claimed is:—

1. In a pipe coupling, the combination with the abutting flanged ends of a pair of pipe sections, inclined lugs carried by one of the flanged ends, a ring having inclined lugs formed interiorly thereof, projections carried by the interior of the ring and having shoulders formed throughout their length, said shoulders being adapted to engage one of the flanged ends of one of the sections to prevent removal of the ring therefrom in one direction, said projections being spaced from the lugs carried by the ring, the first named lugs being adapted to engage in the space between the lugs and projections to limit the turning movement of the ring in relation to the pipe sections, and means passable through the ring to engage the pipe sections to prevent independent rotation of the pipe sections and ring.

2. In a pipe coupling, the combination with the abutting flanged ends of a pair of pipe sections, inclined lugs carried by one of the flanged ends, a ring having inclined lugs formed interiorly thereof, projections carried by the interior of the ring and having shoulders formed throughout their length, said shoulders being adapted to engage one of the flanged ends of one of the sections to prevent removal of the ring therefrom in one direction, said projections being spaced from the lugs carried by the ring, the first named lugs being adapted to engage in the space between the lugs and projections to limit the turning movement of the ring in relation to the pipe sections.

In testimony whereof, I affix my signature, in presence of two witnesses.

DE WITT C. BAILEY.

Witnesses:
SULLIVAN V. JOHNSON,
FRANCIS BOYLE.

Copies of this patent may be obtained for five cents each, by addressing the "Commissioner of Patents, Washington, D. C."